United States Patent
Kao et al.

(10) Patent No.: US 8,972,504 B2
(45) Date of Patent: Mar. 3, 2015

(54) FORWARDING UN-RESPONDED TO INSTANT MESSAGES TO ELECTRONIC MAIL

(75) Inventors: Titus Kao, Somerville, MA (US); Eric S. Portner, Northborough, MA (US); Robert C. Weir, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1789 days.

(21) Appl. No.: 11/941,474

(22) Filed: Nov. 16, 2007

(65) Prior Publication Data

US 2009/0132661 A1    May 21, 2009

(51) Int. Cl.
| | |
|---|---|
| *G06F 15/16* | (2006.01) |
| *H04L 12/58* | (2006.01) |
| *G06Q 10/10* | (2012.01) |
| *G01R 31/08* | (2006.01) |
| *G08C 15/00* | (2006.01) |
| *H04J 1/16* | (2006.01) |
| *H04L 12/26* | (2006.01) |

(52) U.S. Cl.
CPC ............ *H04L 12/581* (2013.01); *G06Q 10/107* (2013.01); *H04L 51/04* (2013.01); *H04L 12/5855* (2013.01)
USPC .......................................... 709/206; 370/224

(58) Field of Classification Search
USPC ................................................ 709/204–207
See application file for complete search history.

(56) References Cited

U.S. PATENT DOCUMENTS

| 7,007,085 B1 | 2/2006 | Malik |
| 2002/0120600 A1* | 8/2002 | Schiavone et al. ................ 707/1 |
| 2003/0229722 A1* | 12/2003 | Beyda ........................... 709/310 |
| 2004/0158611 A1* | 8/2004 | Daniell et al. ................ 709/206 |
| 2005/0004984 A1 | 1/2005 | Simpson |
| 2006/0025164 A1 | 2/2006 | Wang et al. |
| 2006/0252435 A1 | 11/2006 | Henderson et al. |

OTHER PUBLICATIONS

Avrahami et al., QnA: Augmenting an Instant Messaging Client to Balance User Responsiveness and Performance, In Proceedings of the ACM Conference on Computer Supported Cooperative Work (CSCW'04), pp. 515-518, Nov. 2004.
Licq, Pluggins, "Forwarder" pluggin, <http://licq.sourceforge.net/plugins.php> (last visited Nov. 16, 2007).

\* cited by examiner

*Primary Examiner* — Evans Desrosiers
(74) *Attorney, Agent, or Firm* — Cuenot, Forsythe & Kim, LLC

(57) ABSTRACT

A method of forwarding an instant message to electronic mail can begin with determining availability of an instant messaging client for a recipient. The method can continue with sending the instant message to the instant messaging client for the recipient. The method can include not receiving a reply to the instant message within a pre-defined period of time. The method can further include sending an electronic mail message including the instant message to the recipient upon reaching the pre-defined period of time.

17 Claims, 2 Drawing Sheets

FORWARDING UN-RESPONDED TO INSTANT MESSAGES TO ELECTRONIC MAIL

BACKGROUND OF THE INVENTION

Instant messaging enables real-time, two-way, electronic communication over a network, such as the Internet, between two or more users. Typically, users of instant messaging clients log on to a messaging server, thereby establishing presence with the messaging server. A first user of an instant messaging client may choose to contact a second user of another instant messaging client by choosing the second user from a contact list. Usually, the contact list will indicate availability of the second user. The first user may type and send an initial message to the second user. Such an initial message may be a salutation such as "Hi." Upon receiving the initial message, the second user can type and send a response, which may also be a salutation such as "Hi."

The first and second user may proceed to have an electronic conversation or chat in what may be referred to as a messaging session. Typically, the messaging session ends with one of the users sending a closing such as "bye" to the other.

BRIEF SUMMARY OF THE INVENTION

The embodiments disclosed herein relate to forwarding an instant message to electronic mail. One embodiment of the present invention can include a computer-implemented method of forwarding an instant message to electronic mail. The method can include determining availability of an instant messaging client for a recipient and sending the instant message to the instant messaging client for the recipient. The method can include not receiving a reply to the instant message within a pre-defined period of time. A determination can be made that content of the instant message satisfies a criterion for forwarding the instant message by electronic mail. The method can further include sending an electronic mail message including the instant message to the recipient upon reaching the pre-defined period of time.

Another embodiment of the present invention can include a computer implemented method of forwarding an instant message to electronic mail. The method can include determining availability of an instant messaging client for a recipient and sending the instant message to the instant messaging client for the recipient. The method can include not receiving a reply to the instant message within a pre-defined period of time. A determination can be made that the instant message satisfies a criterion for forwarding the instant message by electronic mail. A criteria can be determined by performing an analysis of a text within the instant message. An electronic mail message including the instant message can be sent to the recipient upon reaching the pre-defined period of time.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
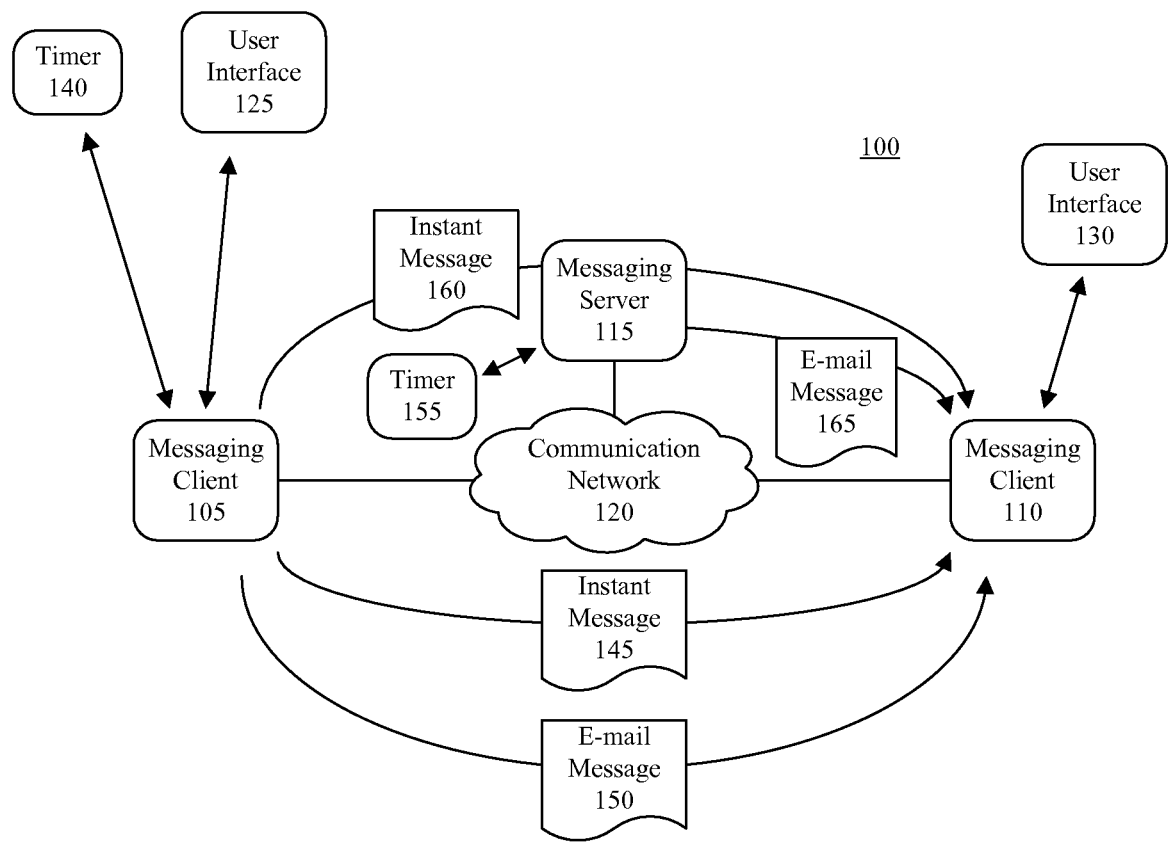
FIG. 1 is a block diagram illustrating a system for forwarding instant messages to electronic mail in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram illustrating an instant messaging (IM) system 100 that forwards an instant message to electronic mail according to one embodiment of the present invention. The messaging system 100 can include instant messaging clients 105 and 110, and a messaging server 115, e.g., an instant messaging server. The instant messaging clients 105 and 110 can be, for example, computers, mobile communication devices, such as mobile telephones or personal data assistants (PDAs), network appliances, gaming consoles, or any other device which can participate in an instant messaging session.

The various components of the messaging system 100 can be communicatively linked by a communication network 120. The communication network 120 can include, for example, a WAN, a LAN, the public switched telephone network, the Web, the Internet, and/or one or more intranets. The communication network 120 also can include one or more wireless networks, whether short or long range.

Each of the messaging clients 105 and 110 can include a respective user interface 125 and 130. Users of the messaging clients 105 and 110 can log on to the messaging server 115 via the user interfaces 125 and 130. Upon logging on to the messaging server 115, availability or presence of the messaging clients 105 and 110 may be indicated to other messaging clients. For example, if both of the messaging clients 105 and 110 are logged on to the messaging server 115, each messaging client 105 and 110 can determine the availability of the other via the messaging server 115.

The availability can be indicated to users of the messaging clients 105 and 110 via the respective user interfaces 125 and 130. While the availability of a messaging client 105 or 110 may be indicated to other messaging clients, the availability does not necessarily mean that the user of the messaging client 105 or 110 is available. For example, the user may be busy working on a project that cannot be interrupted, may be involved in a meeting despite being at a computer, or may be away from his or her computer.

In operation, the user of the messaging client 105 can initiate an instant messaging session with the user of the messaging client 110 by selecting the user of the instant messaging client 110 from a contact list in the user interface 125, typing an instant message in an appropriate window of the user interface 125, and sending the message to the messaging client 110. Such an initial message may be a salutation such as, "Hi," a recipient user's name, or an opening question such as "Are you there?" For the initial message, the user of the messaging client 105 may be referred to as a sender and the user of the messaging client 110 may be referred to as a recipient. By employing a salutation as an initial message, the sender may give the recipient an opportunity to ignore the initial message if the recipient does not want to engage in a messaging session at that time.

In one embodiment, the messaging clients 105 and 110 can act as peers sending messages to the other. For example, the messaging client 105 can send the initial message to the messaging client 110 without involving the messaging server 115. In another embodiment, the messaging server 115 can receive messages from a sending messaging client 105 or 110 and forward the messages to a recipient messaging client 110 or 105. For example, the messaging client 105 can send the initial message to the messaging server 115. The messaging server 115 can forward the initial message to the messaging client 110.

The user of the messaging client 110 may choose to engage in a messaging session with the user of the messaging client 105 by replying to the initial message sent by the messaging client 105. The user of the messaging client 110 may do so by sending a reply that is also a salutation such as "Hi." Here, the user of the messaging client 110 becomes the sender and the user of the messaging client 105 becomes the recipient. Upon receiving the reply from the user of the messaging client 110, the user of the messaging client 105 may then type and send a substantive communication to the user of the messaging client 110. For example, such a substantive communication may be a work related inquiry, a social invitation, or some other substantive communication. The users of the messaging clients 105 and 110 may proceed through a series of messages where each message is a reply to a previous message. As a messaging session proceeds, the messaging clients 105 and 110 each can maintain an instant message transcript that can include a series of messages and replies that begin with the initial message.

According to one embodiment, the messaging client 105 can start a timer 140 upon sending an instant message 145 to the messaging client 110. If the timer 140 reaches a pre-defined period of time and the messaging client 105 has not received a reply to the instant message 145, the messaging client 105 can forward the instant message 145 to the messaging client 110 in an electronic mail message 150. According to this embodiment, the messaging client 105 can send instant messages to the messaging client 110 directly or can send the instant messages to the messaging server 115, which can then forward the instant messages to the messaging client 110.

For example, as a messaging session proceeds between the users of the messaging clients 105 and 110, the user of the messaging client 110 might not reply to the instant message 145 sent by the messaging client 105 before the timer 140 reaches the pre-defined period of time. It may be that the user of the messaging client 110 has become engaged in some other activity such as an impromptu meeting with a colleague or has left his or her desk, possibly going home for the day. Despite the non-reply from the user of the messaging client 110, the messaging client 105 may continue to indicate availability of the messaging client 110. Upon the timer 140 reaching the pre-defined period of time, the messaging client 105 can forward the instant message 145 within the electronic mail message 150 to the user of the messaging client 110.

According to another embodiment where the messaging server 115 forwards instant messages between the messaging clients 105 and 110, the messaging server 115 can start a timer 155 upon sending an instant message 160 to the messaging client 110 on behalf of the messaging client 105. If the timer 155 reaches the pre-defined period of time and the messaging server 115 has not received a reply to the instant message 160, the messaging server 115 can forward the instant message 160 to the user of the messaging client 110 within an electronic mail message 165. The entire instant message, the content of the instant message, or any portion of the instant message may be included within an electronic mail and forwarded to the recipient.

In one embodiment, each messaging client 105 and 110 can include both instant messaging and electronic mail functionality. In another embodiment, the messaging clients may not support electronic mail, but may communicate cooperatively with an electronic mail system, e.g., electronic mail clients and/or servers (not shown). Accordingly, the messaging clients 105 and 110, as well as the messaging server 115, can cause, or initiate, the sending of the electronic mail including the instant message via the electronic mail system to an electronic mail client of the recipient.

The pre-defined period of time can be selected by a user or can be a default value. For example, the messaging client 105 or the messaging server 115 can include a default value for the pre-defined period of time of 15 minutes. If the messaging client 105 or the messaging server 115 allows the user to select the pre-defined period of time, the user may choose to replace the default value with a user-selected value. For example, a user may replace a default value with a user selected value of 5 minutes.

The messaging client 105 or the messaging server 115 may obtain an electronic mail address for the user of the messaging client 110 from an electronic mail directory. For example, such an electronic mail directory may be internal to the messaging client 105, internal to the messaging server 115, or located elsewhere such as within a Lightweight Directory Access Protocol (LDAP) server or as part of an electronic mail client or server for the user of the messaging client 105.

The electronic mail message 150 or 165 can include the instant message transcript for the messaging session. For example, the electronic mail message 150 or 165 can present the instant message for which a reply was not received as a most recent message in the instant message transcript. The electronic mail message 150 or 165 also can include the day and the time that the instant message was sent and a notice that a sender of the instant message did not receive a reply within the pre-defined period of time. For example, the electronic mail message 150 or 165 may identify that the electronic mail message 150 or 165 is automatically forwarding an instant message transcript for a messaging session where a reply to a most recent message sent on a particular day and at a particular time (e.g. Thursday at 2:30 p.m. EDT) was not received within a period of time (e.g. a period of 5 minutes).

According to one embodiment, the messaging client 105 or the messaging server 115 can forward the instant message 145 or 160 upon the timer 140 or 155 reaching the pre-defined period of time regardless of the content of the instant message 145 or 160. According to another embodiment, the messaging client 105 or the messaging server 115 can determine that the content of the instant message 145 or 160 satisfies a criterion for forwarding the instant message by electronic mail before sending the electronic mail message 150 or 165. Such a determination may be made prior to the pre-defined period of time expiring.

In another embodiment, the criterion for forwarding the instant message by electronic mail may be that the instant message is found to not be a salutation message. A salutation message may be a message that presents a salutation only. In contrast, a message that includes a salutation preceding a substantive communication may be more aptly characterized as a substantive communication rather than a salutation message.

For example, a textual analysis may be performed on the instant message to determine whether the instant message matches or substantially matches a salutation message found on a list of salutation messages. The list may include standard salutation messages such as, "Hi," "Are you there?" or "<a recipient's name>," as well as salutation messages added by a user such as "ru there?" If the instant message matches or substantially matches a salutation message found on the list of salutation messages, the instant message need not be forwarded in an electronic mail message.

In another embodiment, the criterion for forwarding the instant message by electronic mail may be that the instant message is found to not be a closing message. A closing message may be a message that presents a closing only. In contrast, a message that ends with a closing expression that follows a substantive communication may be more aptly characterized as a substantive communication rather than a closing message.

For example, a textual analysis may be performed on the instant message to determine whether it matches or substantially matches a closing message found on a list of closing messages. The list may include standard closing messages such as, "Bye," "See you later," or "See you there," as well as user-defined closing messages such as "l8r." If the instant message matches or substantially matches a closing message found on the list of closing messages, the instant message need not be forwarded in an electronic mail message.

It should be appreciated that the content of the instant message may be evaluated using any of a variety of known techniques. Such techniques can include, but are not limited to, natural language understanding, the use of grammars, keyword searching, or the like. These content analysis techniques can be applied to determine information including, for example, salutations and/or closings within instant messages.

According to one embodiment, the messaging client 105 or the messaging server 115 can forward the instant message 145 or 160 by electronic mail upon the timer 140 or 155 reaching the pre-defined period of time. As used herein, "upon the timer reaching the pre-defined period of time" may mean "when the timer reaches the pre-defined period of time" or "after the timer reaches the pre-defined period of time."

According to another embodiment, the messaging client 105 or the messaging server 115 can query a user of the messaging client 105 for approval to forward the instant message 145 or 160 by electronic mail upon the timer 140 or 155 reaching the pre-defined period of time. The messaging client 105 or the messaging server 115 can then forward the instant message 145 or 160 by electronic mail upon receiving approval.

The messaging client 105 or the messaging server 115 may maintain a do-not-forward list that identifies messaging clients for which un-responded messages need not be forwarded by electronic mail. Such a list may be defined by a sender or a receiver. If a sender adds a messaging client for a particular user to a sender-defined do-not-forward list, un-responded to messages sent by the sender to the particular user need not be forwarded by electronic mail. If a receiver adds his or her messaging client to a receiver-defined do-not-forward list, un-responded to messages from any messaging client to the receiver need not be forwarded by electronic mail.

The messaging client 105 or the messaging server 115 may maintain an always forward list. If a messaging client for a particular user is found on the always forward list and the particular user does not respond to a most recent message before the pre-defined period of time expires, the messaging client 105 or the messaging server 115 can forward the instant message transcript to the messaging client for the recipient without querying the user of the messaging client 105 to determine if the instant message 145 or 160 should be forwarded by the electronic mail message 150 or 165.

As a messaging session proceeds between the users of the messaging clients 105 and 110, the messaging client 110 may become unavailable. According to one embodiment, the user of the messaging client 105 may be precluded from sending an instant message to the messaging client 110 while the messaging client 110 indicates an unavailable status. According to this embodiment, if the user of the messaging client 105 attempts to send an instant message to the messaging client 110 while the messaging client 110 remains unavailable, the messaging client 105 or the messaging server 115 can send the instant message as an electronic mail message.

According to another embodiment, the user of the messaging client 105 may be allowed to attempt to send an instant message to the messaging client 110 while the messaging client 110 remains unavailable. According to this embodiment, the message may be queued at the messaging client 105 or the messaging server 115 for delivery to the messaging client 110 upon the messaging client 110 indicating an available status. Here, the messaging client 105 or the messaging server 115 can also forward the message by electronic mail. The messaging client 105 or the messaging server 115 can send the electronic mail message upon queuing of the message for delivery or can wait for the pre-defined period of time to expire before sending the electronic mail message.

Figures 2, 3:
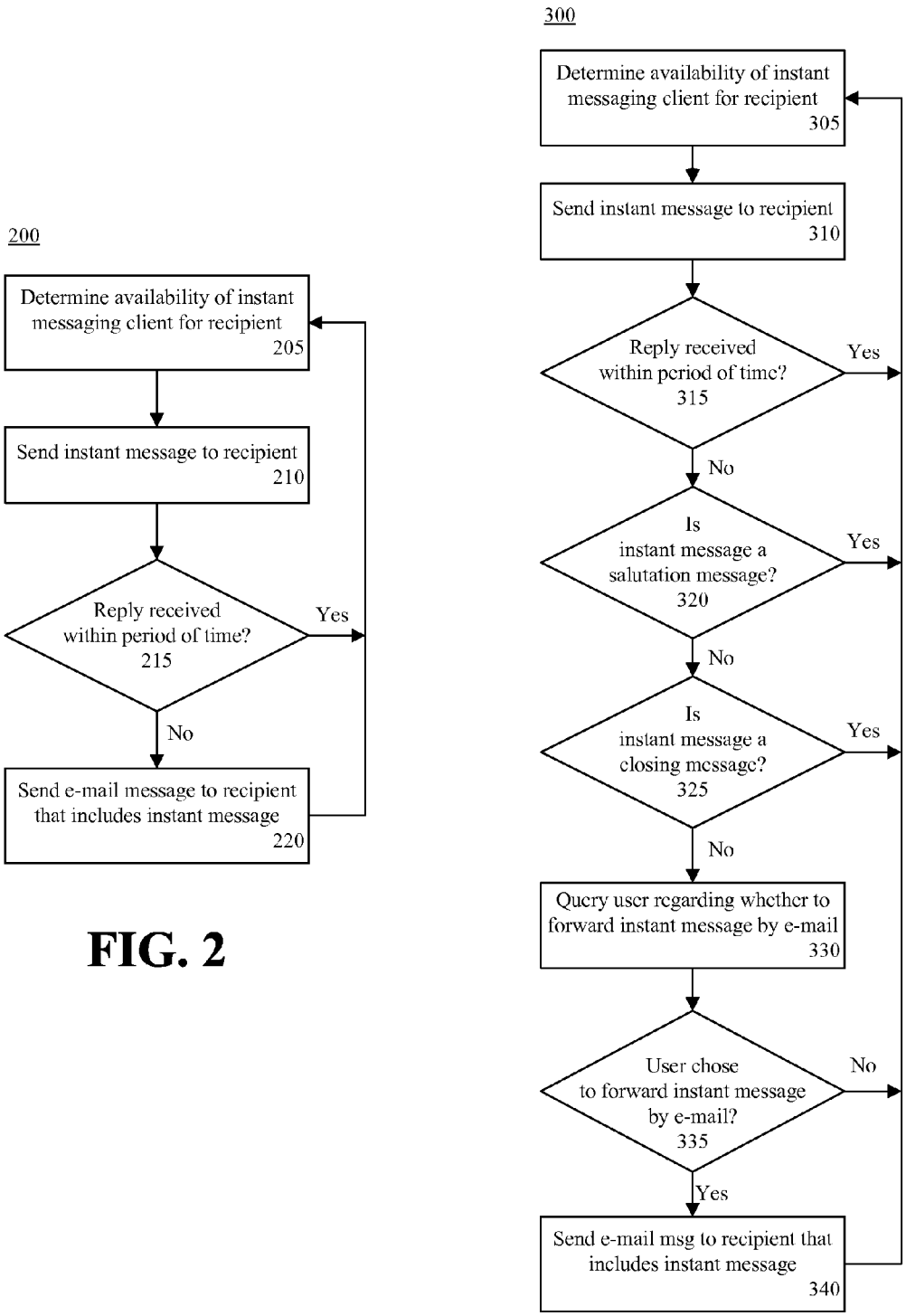
FIG. 2 is a flow chart illustrating a method of forwarding instant messages to electronic mail in accordance with another embodiment of the present invention.
FIG. 3 is another flow chart illustrating a method of forwarding instant messages to electronic mail in accordance with another embodiment of the present invention.

FIG. 2 is a flow chart illustrating a method 200 of forwarding an instant message to electronic mail according to another embodiment of the present invention. The method 200 can begin in a state where the sender and recipient have established presence with the messaging server via each user's respective messaging client. The method 200 can begin with determining availability of an instant messaging client for a recipient in step 205. In step 210, an instant message can be sent to the recipient thereby establishing a messaging session.

In step 215, a determination can be made as to whether a reply to the instant message has been received within a pre-defined period of time. If a reply has been received, the method can return to step 205. If a reply has not been received, an electronic mail message that includes the instant message can be sent to the recipient in step 220. In another embodiment, the electronic mail message further can include an instant message transcript for the messaging session where the instant message forms a most recent message of a series of messages exchanged between the sender of the instant message and the recipient.

The method 200 may provide assurance to a sender of the instant message in that, if the recipient does not reply within the pre-defined period of time, the instant message may be forwarded by electronic mail. The method 200 may also help to reduce information overload for the recipient in that only instant messages for which a reply has not been received may be forwarded by electronic mail. The recipient may appreciate receiving such instant messages by electronic mail knowing that the messages are those that the recipient was not able to respond to within the pre-defined period of time.

FIG. 3 is a flow chart illustrating a method 300 of forwarding an instant message to electronic mail according to another embodiment of the present invention. The method 300 can begin with determining availability of an instant messaging client for a recipient in step 305. In another embodiment, determining availability of the instant messaging client may be performed by a messaging server recognizing that the instant messaging client for the recipient is logged on to the messaging server. In another embodiment, determining availability of the instant messaging client may be performed by an instant messaging client for a sender receiving a notice of the availability from the instant messaging server or receiving a notice of availability from the instant messaging client for the recipient.

In step 310, an instant message can be sent to the recipient. As noted, the instant messaging client for the sender can send the message to the instant messaging client for the recipient or can send the instant message to the instant messaging server, which can then forward the instant message to the instant messaging client for the recipient. The instant message may be an initial message sent to the recipient or the instant message may be a most recent instant message of an instant messaging session that includes a series of messages and replies exchanged between the sender and the recipient.

In step 315, a determination can be made as to whether a reply to the instant message has been received within a pre-defined period of time. In one embodiment, the pre-defined period of time may be a default period of time. For example, the messaging client for the sender may include a default period of time of 15 minutes. In another embodiment, the pre-defined period of time may be a user selected period of time. For example, a user may adjust a default period of time for a messaging client to a period of time of 5 minutes.

In one embodiment, the messaging client that sent the instant message can measure a time from sending the instant message to determine whether a reply to the instant message has been received within the pre-defined period of time. In another embodiment, for example, where the messaging server forwards messages between the messaging clients, the messaging server can measure the time from sending the instant message to determine whether a reply to the instant message has been received within the pre-defined period of time. If a reply is received within the pre-defined period of time, the method can return to step 305. If a reply is not been received within the pre-defined period of time, the method can continue to step 320.

In step 320, a determination can be made as to whether the instant message is a salutation message. The instant message may be a salutation message if the instant message matches or substantially matches a salutation message found on a list of salutation messages. The list may include standard salutation messages such as, "Hi," "Are you there?" or "<a recipient's name>," as well as salutation messages added by a user such as "ru there?" If the instant message is determined to be a salutation message, the method can return to step 305. By not forwarding instant messages that are found to be salutation messages, information overload for the recipient may be further reduced by not cluttering the recipient's electronic mail inbox with the salutation messages. Also, the sender may be assured that, if he or she sends a salutation message, it may not contribute to information overload for the recipient. If the message is not determined to be a salutation message, the method can continue to step 325.

In step 325, a determination can be made as to whether the instant message is a closing message. The instant message may be a closing message if the instant message matches or substantially matches a closing message found on a list of closing messages. The list may include standard closing messages such as, "Bye," "See you later," or "See you there," as well as user-defined closing messages such as "l8r." If the instant message is determined to be a closing message, the method can return to step 305. By not forwarding instant messages that are found to be closing messages, information overload for the recipient may be further reduced by not cluttering the recipient's electronic mail inbox with the closing messages. Also, the sender may be assured that, if he or she sends a closing message, it may not contribute to information overload for the recipient. If the instant message is determined not to be a closing message, the method can continue to step 330.

In step 330, the user that sent the instant message to which no response was found may be optionally queried by the messaging client or the messaging server as to whether to forward the instant message by electronic mail. In another embodiment, step 330 may include querying the user that sent the instant message whether to forward an instant message transcript of the messaging session by electronic mail. The instant message transcript can include the instant message as a most recent instant message in a series of messages and replies that form a messaging session between the sender and the recipient of the instant message.

In step 335, a determination can be made as to whether the user chose to forward the instant message or the instant message transcript by electronic mail. If the user chose not to forward the instant message or the instant message transcript by electronic mail, the method can return to step 305. If the user chose to forward the instant message or the instant transcript by electronic mail, the method can continue to step 340. In step 340, the instant message or the instant message transcript can be forwarded to the recipient in an electronic mail message. The electronic mail message can include a time and date of sending the instant message to the recipient and a notice that the messaging client for the sender did not receive a reply within the pre-defined period of time.

At some point in a messaging session, a user may no longer have presence on the messaging server. For example, the recipient may shut down his or her messaging client. Thus, it may be that a messaging client for a sender or a messaging server may sense unavailability of the messaging client for the recipient. In such a situation the sender may attempt to send an instant message to the recipient. If the instant messaging client does not allow messages to be sent to instant messaging clients that are not available, the instant message may be immediately and automatically forwarded to the recipient in an electronic mail message.

In some situations, a messaging client may be allowed to attempt to send an instant message to a messaging client for a recipient that is not available. For example, the instant message may be queued at the messaging client for the sender or may be queued at a messaging server in anticipation of the messaging client for the recipient becoming available. If the instant messaging client allows messages to be sent to an instant messaging client that is unavailable, e.g., has no presence, the instant message may be sent in anticipation of the instant messaging client for the recipient becoming available. In such a situation, the instant messaging client or the instant messaging server may forward the instant message in an electronic mail message if a reply to the instant message is not received within the pre-defined period of time.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of forwarding an instant message to electronic mail, the method comprising:
   determining availability of an instant messaging client for a recipient;
   sending the instant message to the instant messaging client for the recipient;
   not receiving a reply to the instant message within a pre-defined period of time;
   upon reaching the pre-defined period of time, determining that the instant message is not a salutation message and thus satisfies a criterion for forwarding the instant message in an electronic mail message; and
   sending the electronic mail message comprising the instant message to the recipient.

2. The method of claim 1, wherein determining that the instant message satisfies the criterion for forwarding the instant message in the electronic mail message further comprises determining that the instant message is not a closing message.

3. The method of claim 1, further comprising querying a user for an approval to send the electronic mail message and receiving the approval.

4. The method of claim 1, wherein the pre-defined period of time comprises a user selectable period of time.

5. The method of claim 1, wherein the electronic mail message further comprises:
   a time of sending the instant message to the recipient; and
   a notice that an instant message client for a sender did not receive a reply within the period of time.

6. The method of claim 1, wherein the electronic mail message further comprises an instant message transcript.

7. The method of claim 1, further comprising:
   sensing unavailability of a second instant messaging client for a second recipient;
   attempting to send a second instant message to the second instant messaging client for the second recipient; and
   sending a second electronic mail message to the second recipient that comprises the second instant message.

8. The method of claim 1, further comprising determining that the recipient is not on a do-not-forward list.

9. The method of claim 1, wherein a sending instant messaging client initiates sending of the electronic mail message that comprises the instant message.

10. The method of claim 1, wherein an instant messaging server initiates sending of the electronic mail message that comprises the instant message.

11. A computer-implemented method of forwarding an instant message to electronic mail, the method comprising:
   determining availability of an instant messaging client for a recipient;
   sending the instant message to the instant messaging client for the recipient;
   not receiving a reply to the instant message within a pre-defined period of time;
   determining that the instant message is not a salutation message and thus satisfies a criterion for forwarding the instant message in an electronic mail message, wherein the instant message is determined not to be a salutation message by performing an analysis of a text within the instant message; and
   upon reaching the pre-defined period of time, sending the electronic mail message comprising the instant message to the recipient.

12. The method of claim 11, wherein determining that the instant message is not the salutation message comprises performing a textual analysis of the instant message to determine that the instant message does not match a pre-defined salutation message found on a list of salutation messages.

13. The method of claim 11, wherein determining that the instant message satisfies the criterion for forwarding the instant message in the electronic mail message further comprises determining that the instant message is not a closing message.

14. The method of claim 13, wherein determining that the instant message is not the closing message comprises performing a textual analysis of the instant message to determine that the instant message does not match a pre-defined closing message found on a list of closing messages.

15. The method of claim 11, further comprising querying a user for an approval to send the electronic mail message and receiving the approval.

16. The method of claim 11, wherein the electronic mail message further comprises an instant message transcript.

17. A computer program product, comprising:
   a computer-readable device comprising computer-usable program code stored thereon that forwards an instant message to electronic mail, the computer-readable device comprising:
   computer-usable program code that determines availability of an instant messaging client for a recipient;
   computer-usable program code that sends the instant message to the instant messaging client for the recipient;
   computer-usable program code that determines that a reply to the instant message has not been received within a pre-defined period of time;
   computer-usable program code that determines that the instant message is not a salutation message and thus satisfies a criterion for forwarding the instant message in an electronic mail message; and
   computer-usable program code that sends an electronic mail message comprising the instant message to the recipient upon reaching the pre-defined period of time, wherein
   the computer-readable device is not a transitory signal per se.

* * * * *